United States Patent [19]
Sugino et al.

[11] 3,963,271
[45] June 15, 1976

[54] FINGER MECHANISMS OF INDUSTRIAL ROBOTS

[75] Inventors: Yoshide Sugino, Kamakura; Nobuo Okonogi, Chigasaki; Shinsaku Nokagawa, Yokohama, all of Japan

[73] Assignee: Yamatake-Honeywell Company, Limited, Tokyo, Japan

[22] Filed: Oct. 15, 1974

[21] Appl. No.: 514,452

[52] U.S. Cl. ............... 294/86 R; 214/1 BC; 214/1 BD; 267/64 R; 294/88; 294/106
[51] Int. Cl.² ............... B25J 15/00; F16F 9/00
[58] Field of Search ............... 294/67 BC, 86 R, 88, 294/106; 188/266, 268; 267/64 R; 248/358 R; 214/1 CM, 1 B, 1 BB, 1 BC, 1 BD; 269/275, 285, 318

[56] References Cited
UNITED STATES PATENTS

| | | |
|---|---|---|
| 2,621,924 | 12/1952 | Panhard .................. 267/64 R |
| 2,828,960 | 4/1958 | Lucien et al. .................. 267/64 R |
| 3,148,719 | 9/1964 | Drake et al. .................. 214/1 BC X |
| 3,419,158 | 12/1968 | Lemelson .................. 214/1 CM |
| 3,850,319 | 11/1974 | DiFrank et al. .................. 214/1 BD X |

*Primary Examiner*—Evon C. Blunk
*Assistant Examiner*—Johnny D. Cherry
*Attorney, Agent, or Firm*—Charles E. Pfund

[57] ABSTRACT

In a finger mechanism of an industrial robot of the type comprising a plurality of fingers for clamping an article to be manipulated and mounting bars for connecting the fingers to a source of drive, cushion mechanisms are interposed between respective fingers and mounting bars so as to prevent the forces applied to the fingers from transmitting directly to the drive source.

12 Claims, 9 Drawing Figures

FINGER MECHANISMS OF INDUSTRIAL ROBOTS

BACKGROUND OF THE INVENTION

This invention relates to a finger mechanism of an industrial robot utilized in various fields of industry.

Such robot is usually used to transport an article from one point to the other. The robot to which the invention is applicable is used where the end point of the article is definite. For example, the robot is used to transport a workpiece to a chuck mounted on the head stock of a lathe and then to secure the workpiece by the chuck. When these operations are performed manually, the operator usually moves the workpiece to substantially the center of the chuck, then closer to the center of the chuck by moving the pawls and finally snugly abuts the workpiece to the bottom of the chuck. If such operations are to be performed by a robot, it is necessary to construct the robot such that the workpiece securely held by the fingers of the robot is brought close to the chuck by moving the arm of the robot which carries the fingers along a prescribed path, and then secure the workpiece to the chuck by moving the pawls thereof. If the workpiece is not correctly held by the fingers, the workpiece would be inclined with respect to a reference surface of the chuck or would become eccentric with respect to the chuck when the workpiece is transported to the chuck by the robot. If the workpiece were fastened to the chuck without regarding such inclined or eccentric condition, the fingers of the robot and the arm carrying the fingers will be subjected to an abnormal force thus damaging the robot. Further, if the workpiece were secured to the chuck and worked under such inclined or eccentric condition, the accuracy of the machining would be impaired.

SUMMARY OF THE INVENTION

Accordingly, it is an object of this invention to provide an improved finger mechanism for an industrial robot.

Another object of this invention is to provide an improved finger mechanism for an industrial robot capable of preventing undue force from being applied to the main body of the robot even when the workpiece is not mounted on a correct position.

Still another object of this invention is to provide a novel finger mechanism for an industrial robot capable of being accurately positioned in accordance with other operating mechanisms which cooperate with the robot.

According to this invention, there is provided a finger mechanism of an industrial robot of the type comprising a plurality of fingers for clamping an article to be manipulated and mounting bars for connecting the fingers to a drive source, characterized by cushion machanisms interposed between respective fingers and the mounting bars thereby preventing the forces applied to the fingers from transmitting directly to the drive source.

There is also provided a cushion mechanism comprising a hollow cylindrical housing, a cylinder contained in the housing and extending in the axial direction thereof, a piston slidably contained in the cylinder, a piston rod connected to the piston and extending through one end of the cylinder, a nipple secured to the cylinder for admitting motive fluid into the cylinder, a first supporting member for yieldingly supporting the opposite end of the cylinder by the housing, a second supporting member arranged on the one end of the cylinder for supporting the piston rod, and means for mounting a finger on the outer end of the piston rod.

DESCRIPTION OF THE PREFERRED EMBODIMENTS

Figure 1:
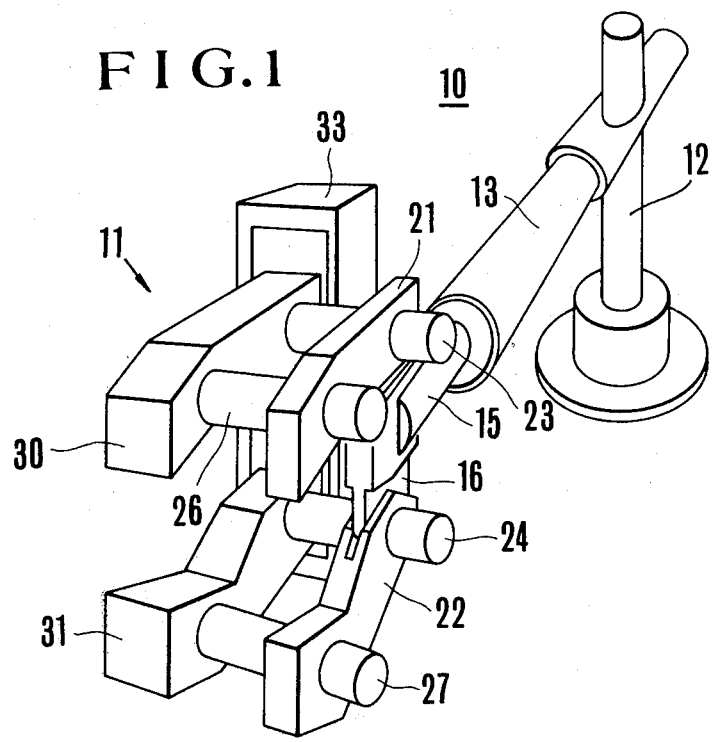
FIG. 1 is a perspective view of one example of an industrial robot incorporated with a novel finger mechanism of this invention.

The robot 10 diagrammatically shown in FIG. 1 and incorporated with the novel finger mechanism 11 of this invention comprises a horizontal arm 13 mounted on a vertical post 12 to be rotatable in a horizontal plane. One end of a slotted rod 15 is secured to the outer end of the arm 13 and the central portion of a supporting bar 16 is fitted in the slot of the rod 15. According to this invention a pair of mounting bars 21 and 22 are rotatably mounted on the opposite ends of the supporting bar by means of novel cushion mechanisms 23 and 24 embodying the invention. Each of the mounting bars is provided with a vertical slot at one end thereof for rotably receiving the supporting bar 16. The opposite ends of the mounting bars 21 and 22 are bent to oppose each other in the same manner as the fingers described later, and cushion mechanisms 26 and 27 identical to cushion mechanisms 23 and 24 are mounted on these bent ends, respectively. These cushion mechanisms are used to resiliently mount fingers 30 and 31 on the mounting bars 21 and 22. Thus, on the lefthand ends of the cushion mechanisms 23, 24, 26 and 27 are mounted fingers 30 and 31 with their outer ends bent to oppose each other. As shown, the mounting bars 21 and 22 and the fingers 31 and 34 are disposed in parallel with each other. The opposite ends of the fingers 30 and 31 are connected to a driving member 33 for opening and closing the fingers in accordance with electric signals supplied to the driving member.

Thus, the robot 10 is constructed such that its arm 13 is rotated in a horizontal plane in accordance with electric signals supplied from a control circuit, not shown, and that the fingers 30 and 31 are operated in accordance with the signals supplied to the driving member 33. It is a feature of this invention to interpose cushion mechanisms 23, 24, 26 and 27 between mounting bars 21 and 22 and fingers 30 and 31, respectively. Consequently, even when an undue force is applied to the fingers, it will not be transmitted to the arm 13.

Figure 2:
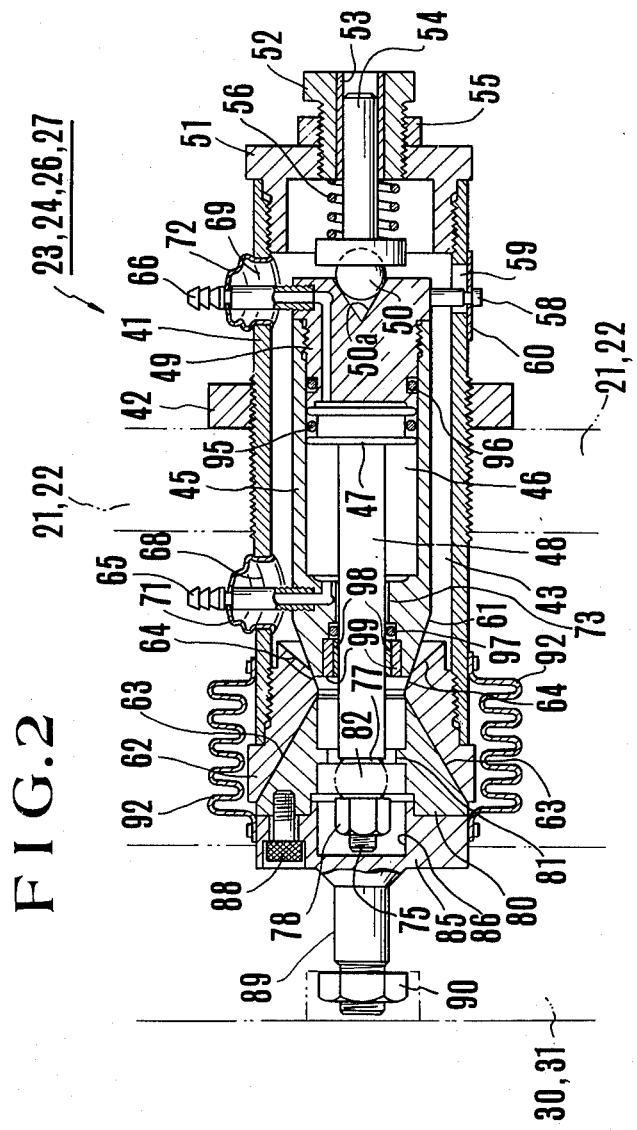
FIG. 2 is a longitudinal sectional view of a cushion mechanism utilized in the finger mechanism shown in FIG. 1.

The detail of the construction of the cushion mechanisms will now be described with reference to FIG. 2.

Cushion mechanisms 23 and 24 function to rotatably mount the mounting bars 21 and 22 on supporting bar 16 and to support the fingers, whereas cushion members 26 and 27 are used only to support the fingers. In this manner, as cushion mechanisms 23, 24, 26 and 27 have the same construction but differ slightly in the manner of connection to the supporting bar, it should be understood that FIG. 2 shows the construction of any one of the cushion mechanisms.

As shown, the cushion mechanism comprises a hollow cylindrical housing 41 provided with screen threads on its outer periphery for receiving a lock nut 42 adapted to fasten the mounting bars 21 or 22 to the cushion mechanism. A cylinder 45 is contained in the inner space 43 of the housing 41 in relation therewith. Inside the cylinder chamber 46 of the cylinder 45 is disposed a piston 47 having a piston rod 48. The righthand end of cylinder 45 is closed by a cylinder head 49 provided with a recess 50a for receiving a ball 50 which is supported by a ball socket 54 slidably supported by a bushing 53. The bushing 53 is fitted in a nut 52 threaded into the head 51 secured to the righthand end of the housing 41. The nut 52 is held in position by a lock nut 55. A spring 56 is interposed between the ball socket 54 and the head 51 of the housing 41 for normally urging the ball socket 54 towards the cylinder 45. As a result, the force imparted to the socket 54 is transmitted to the cylinder head 49 through the ball 50 to urge the cylinder 45 toward left, as viewed in FIG. 2.

A downwardly extending pin 58 is secured to the periphery of the cylinder head 49 to project outwardly through an elongated slot 59 provided for the housing 41 in the axial direction thereof. The purpose of this pin 58 is to prevent rotation of cylinder 45 with respect to the housing 41 while permitting axial movement of the cylinder 45. The slot 59 is closed by a cover 60 secured to pin 58.

The left hand end of the cylinder 45 is tapered as at 61 to form a frusto-conical member to cooperate with a female block 62 mounted on the lefthand end of the housing 41. The block 62 is provided with tapered inner surfaces 63 and 64 diverging in the opposite directions. A nipple 65 is connected to the tapered surface 61 of the cylinder 45 for admitting and discharging motive fluid into and from the cylinder chamber 46. Similar nipple 66 is connected to the cylinder head 49. These nipples 65 and 66 extend outwardly through openings 68 and 69 formed through the cylinder 41, the openings 68 and 69 being closed by resilient covers 71 and 72. The piston rod 48 extends through an axial opening 73 provided for the tapered portion and is terminated with a threaded rod 75 having a smaller diameter than the piston rod 48. A ball 77 having a through opening is mounted on the threaded rod 75 and a nut 78 is threaded on the rod 75 to prevent the outward movement of the ball 77. A male tapered block 80 is fitted in the tapered opening 63 of the female block 62. The male block 80 is provided with an axial through opening 81 to receive a ring 82 which holds the ball 77. The outer end of the threaded rod 75 of the piston rod 48 is contained in recess 86 formed in a cap 85 secured to the tapered male block 80 by means of bolts 88. The cap 85 is received in a recess formed in the finger 30 or 31 and a rod 89 provided for the cap extends through the finger and is secured thereto by means of a nut 90. There is provided a cylindrical bellows 92 having one end connected to the cap 85 and the other end to cylinder 41 close to the female block 62. The piston 47 is provided with an O-ring 95 for maintaining an air tight sliding contact between the piston 47 and the inner wall of the cylinder. Further, an O-ring 96 is provided between the cylinder head 49 and the inner wall of the cylinder 45 for sealing the cylinder chamber 46, and an O-ring 97 is provided between the piston rod 48 and the inner wall of the tapered portion 61 for isolating the cylinder chamber 46 from the outside. The O-ring 97 is retained by a bushing 98 which is supported by an outer bushing 99 in the opening 73 in the tapered portion 61 of the cylinder 45.

The operation of the cushion mechanism shown in FIG. 2 will now be described with reference to FIGS. 3A through 3D and FIG. 4. In FIGS. 3A through 3D, the mounting bars 21 and 22 and the driving member 33 are not shown because they are not related to the following description.

Figure 3A:
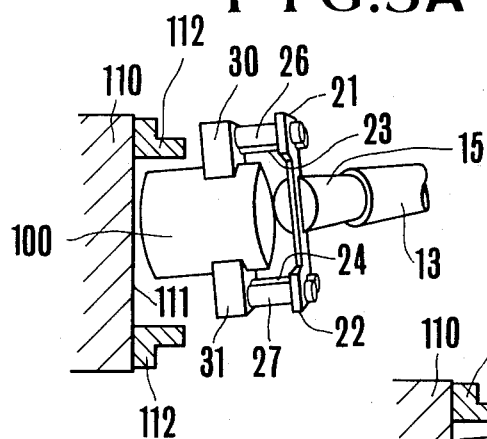
FIGS. 3A through 3D are partial views for explaining the operation of the finger mechanism utilizing the cushion mechanism shown in FIG. 2.
Figure 3B:
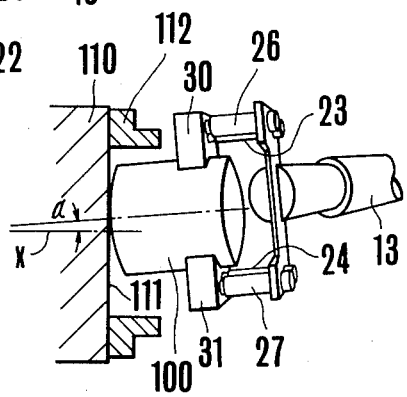
Figure 3C:
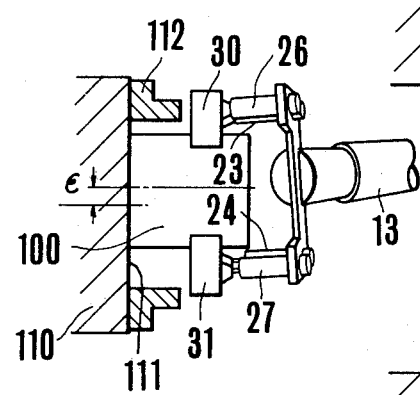
Figure 4:
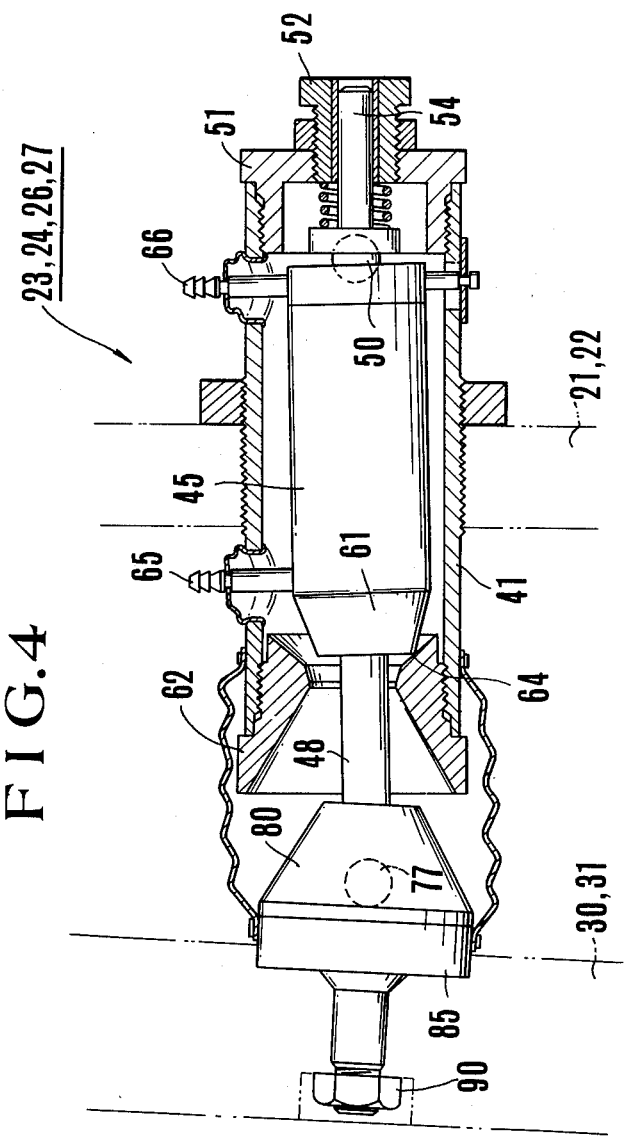
FIG. 4 is a partial longitudinal sectional view showing a condition after the cushion mechanism shown in FIG. 2 has operated to move the piston to the left.

As shown in FIG. 3A a workpiece 100 (or an article to be transported) is clamped between fingers 30 and 31 by operating the driving member 33 in a manner well known in the art. Then the arm 13 is rotated in the horizontal plane to bring the workpiece close to the chuck 110 of a lathe, for example. At this time, under the control of a signal from a control device, not shown, of the robot 10, pressurized fluid is supplied to the nipples of respective cushion mechanisms 23, 24, 26 and 27 for moving to the left respective pistons 47 together with piston rods 48. As a result, the leftward movement of the piston rods 48 are transmitted to tapered male blocks 80 and caps 85 through rings 82 thereby disengaging the male blocks 80 from female blocks 62 as shown in FIG. 4. Accordingly, the bellows 92 is expanded. When the male block 80 and the cap 85 which support the finger are separated from the female block 62 as described above, the tapered portion 61 is caused to slide downwardly along the inclined surface 64 by the weight of the cylinder 45, fingers 30 and 31 and the workpiece 100 whereby the cylinder 45 is moved to the right. This movement is resisted by spring 56 and finally a balanced condition is reached as shown in FIG. 4. Since the righthand end of the cylinder 45 or head 49 is supported by the housing 41 through the ball 50, said downward displacement of the cylinder 45 is possible.

As the arm 13 is rotated further toward the right, a portion of the workpiece 100 remote from the fingers 30 and 31 engages the reference surface 111 of chuck 110 at an inclination angle α. As above described, since the fingers 30 and 31 are mounted on the mounting bars 21 and 22 and hence connected to the arm 13 through cushion mechanisms 23, 24, 26 and 27 which can rotate and move in the axial direction, the end surface of the workpiece 100 remote from the fingers is caused to snugly engage the reference surface 111 of the chuck.

Figure 3D:
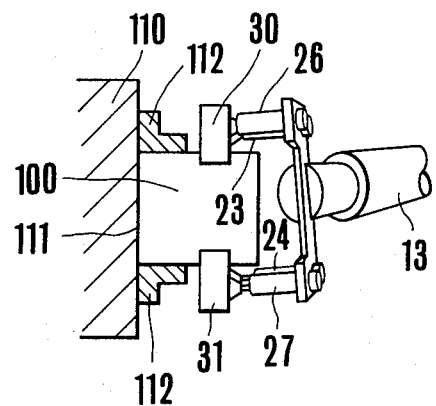

Under these conditions, however, the center of the workpiece 100 is displaced by ε from the center of the chuck 110. But as the fingers 30 and 31 have a certain degree of freedom, the workpiece 100 will be secured to the chuck at the correct position as the pawls 112 are advanced toward the center, thus eliminating the eccentricity ε. FIG. 3D shows this condition. Then the workpiece is machined by the lathe.

Although the operation for mounting the workpiece on the chuck has been described in the above, it is possible to dismount the workpiece by reversing the operation. In the latter case also, the cushion mechanisms 23, 24, 26 and 27 operate effectively. In this case, when fingers 30 and 31 clamp the workpiece the pressurized fluid is introduced into the cylinder 45 through nipple 65 to move the piston 47 to the right together with the piston rod 48 and the elements connected thereto thus returning them to the positions shown in FIG. 1.

As described above, the novel finger mechanism of this invention for an industrial robot can mount a workpiece on the chuck of a lathe, for example, without any inclination. Moreover, even when the workpiece is initially mounted on the reference surface of the chuck in an eccentric relation thereto, the workpiece is automatically brought to the correct or centric position as the pawls are moved toward the center. Accordingly, it is possible to prevent machining of the workpiece mounted on an incorrect position. Further, as the pressure is applied to the workpiece by the arm until the pawls are completely closed there is no fear of dropping the workpiece or causing inclination of the workpieces by the closing operation of the pawls.

Even when the workpiece is mounted on the chuck with an inclination or eccentricity, as the pawls have a certain degree of freedom with respect to the arm, there is no fear of applying an undue force upon the robot, thus preventing its damage. Such advantageous effect can also be obtained when the workpiece is dismounted from the chuck.

Figure 5:
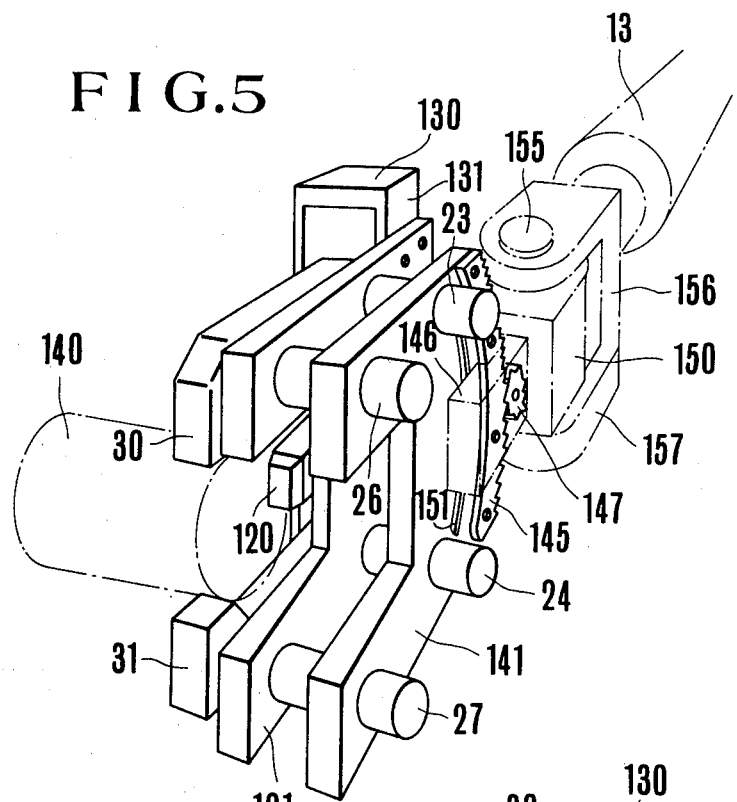
FIG. 5 is a perspective view showing a modified embodiment of the finger mechanism.

FIG. 5 illustrates another embodiment of this invention utilizing three fingers 30, 31 and 120. In this case, as it is impossible to directly mount these fingers on a stationary mounting bar, an auxiliary bar 121 is interposed between the fingers and the mounting bar. The auxiliary bar 121 is secured to one side wall 131 of a driving member 130 by means of screws or the like. As before, the driving member 130 supports one end of the fingers 30, 31 and 120 for controlling the operation thereof. The auxiliary bar 121 extends in the same direction and in parallel with the fingers. The auxiliary bar 121 is machined to have a configuration such that it will not interfere with the operations of the fingers 30, 31 and 120 for clamping the workpiece 140. In this example, the auxiliary bar 121 has a form of a letter C. The cushion mechanisms 23, 24, 26 and 27 which have been interposed between the mounting bars 21 and 22 and the fingers 30 and 31 in the embodiment shown in FIG. 1 are interposed between the auxiliary bar 121 and the mounting bar 141. In this embodiment, the mounting bar 141 comprises a C shaped plate and between its base and the arm 13 is interposed an additional mechanism that permits fingers 30, 31 and 120 to swing in the vertical direction about the end of the arm 13. More particularly, an arcuate rack 145 engaging a pinion 147 of a driving member 146 is secured to the rear end (or righthand end as viewed in FIG. 5) of the mounting bar 141. The driving member 146 is carried by a hinged block 150 and is constructed to move along a guide groove 151 which receives a pin (not shown) projecting from a driving member 146. The hinged block 150 is mounted on a C shaped yoke 156 through a pivot pin 155, and the yoke 156 is mounted on one end of the arm 13. A driving member 157 is provided for swinging the block 150 about pin 155 in the horizontal direction.

Figure 6:
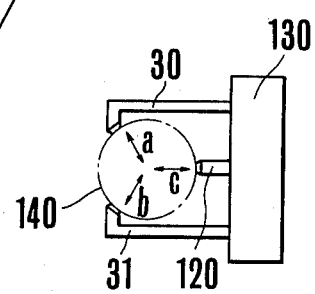
FIG. 6 is a diagrammatic perspective view useful to explain the operation of the finger mechanism shown in FIG. 5.

In this embodiment, the workpiece 140 is clamped by three fingers 30, 31 and 120 thus improving the stability. The lengths of these fingers and the spacings therebetween are determined in accordance with the shape of the workpiece. This can be accomplished by adjusting the fingers 30, 31 and 120 in the directions shown by arrows a, b and c shown in FIG. 6 by means of driving member 130.

With the construction shown in FIG. 5, as it is possible to swing the fingers 30, 31 and 120 in the vertical and horizontal directions with respect to the center axis of arm 13 it is possible to increase the freedom of the operation of the fingers.

The conception disclosed in FIG. 5 can also be applied where the number of the fingers is increased beyond 3. In such a case cushion mechanisms are arranged between a member supporting an additional finger and a member connected to the arm 13.

Although the invention has been shown and described in terms of some preferred embodiments thereof, it should be understood that the invention is not limited to these specific embodiments. For example, instead of mounting and dismounting a workpiece on and from the chuck of a lathe, the fingers of this invention can be used to transport an article from one position to the other and to position the article in the correct position, which may be vertical, horizontal or inclined position. Further, instead of securing the central portion of the housing to the mounting bar, one end of the housing may be secured.

What is claimed is:

1. In a finger mechanism of an industrial robot of the type comprising a plurality of fingers for clamping an article to be manipulated, a drive source for opening and closing said fingers, a mounting bar for supporting each of said fingers, and cushion mechanisms interposed between respective fingers and said mounting bar, thereby preventing undue forces applied to said fingers from transmitting directly to said mounting bar, the improvement wherein each cushion mechanism comprises a hollow cylindrical housing, a cylinder contained in said housing and extending in the axial direction thereof, a piston slidably contained in said cylinder, a piston rod connected to said piston and extending through one end of said cylinder, a nipple secured to said cylinder for admitting motive fluid into said cylinder, a first supporting member for yieldingly supporting the opposite end of said cylinder by said housing, a second supporting member arranged on said one end of said cylinder for supporting said piston rod, and means for mounting a finger on the outer end of said piston rod.

2. The finger mechanism according to claim 1 wherein said second supporting member comprises a female block provided with a pair of tapered openings diverging in opposite directions and said cylinder is provided with a conical member on said one end, said conical member cooperating with one of said tapered openings.

3. The finger mechanism according to claim 2 wherein a tapered male block cooperating with the other tapered opening of said female block is secured to the outer end of said piston rod and said finger is mounted on said male block.

4. The finger mechanism according to claim 3 wherein said tapered male block is mounted on said piston rod through a ball.

5. The finger mechanism according to claim 3 wherein said tapered male block is connected to said housing through a bellow.

6. The finger mechanism according to claim 1 wherein said first supporting member comprises a ball socket projecting inwardly from one end of said housing, a head for closing said other end of said cylinder, said head being provided with a recess and a ball is held in said recess by said socket.

7. The finger mechanism according to claim 1 wherein said cylinder is provided with a pin near its end close to said first supporting member, and said pin extends through an opening provided through the wall of said housing for preventing relative rotation between said cylinder and said housing.

8. The finger mechanism according to claim 1 wherein one end of each cushion mechanism is secured to a mounting bar and the other end is secured to an auxiliary bar secured to a supporting member of a finger.

9. The finger mechanism according to claim 8 wherein said finger mechanism comprises at least three opposing fingers which are connected to a driving means for operating them to clamp an article.

10. The finger mechanism according to claim 1 wherein each of said mounting bars is connected to a supporting arm through a rack mechanism which moves said fingers in the vertical direction.

11. The finger mechanism according to claim 10 wherein said rack mechanism is pivotally mounted on a pivot pin provided at one end of said arm for swinging said arms in the horizontal direction about said pivot pin.

12. The finger mechanism according to claim 1 wherein there are provided four cushion mechanisms, two of said cushion mechanisms interconnecting one finger to one mounting bar and the remaining two interconnecting the other finger to the other mounting bar.

* * * * *

UNITED STATES PATENT AND TRADEMARK OFFICE
CERTIFICATE OF CORRECTION

PATENT NO. : 3,963,271
DATED : June 15, 1976
INVENTOR(S) : Yoshihide Sugino, Nobuo Okonogi, Shinsaku Nakagawa It is certified that error appears in the above-identified patent and that said Letters Patent are hereby corrected as shown below:

In the legend, correct the spelling of the first named inventor from "Yoshide Sugino" to -- Yoshihide Sugino --; and correct the spelling of the last named inventor from "Shinsaku Nokagawa" to -- Shinsaku Nakagawa --.

Column 3, line 15, insert -- concentric -- before "relation".

Signed and Sealed this

Twenty-fourth Day of May 1977

[SEAL]

Attest:

RUTH C. MASON
*Attesting Officer*

C. MARSHALL DANN
*Commissioner of Patents and Trademarks*